(12) United States Patent
Pathak et al.

(10) Patent No.: US 11,551,120 B2
(45) Date of Patent: Jan. 10, 2023

(54) SYSTEMS AND METHODS FOR PREDICTING PERFORMANCE

(71) Applicant: PAYPAL, INC., San Jose, CA (US)

(72) Inventors: Sunil Kishor Pathak, Cupertino, CA (US); Prasanth Kuricheti, San Jose, CA (US); Srikanth Yadavilli, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 271 days.

(21) Appl. No.: 16/916,018

(22) Filed: Jun. 29, 2020

(65) Prior Publication Data

US 2021/0406721 A1 Dec. 30, 2021

(51) Int. Cl.
| | |
|---|---|
| *G06F 8/65* | (2018.01) |
| *G06N 5/04* | (2006.01) |
| *G06N 20/20* | (2019.01) |
| *G06N 5/00* | (2006.01) |
| *G06F 9/48* | (2006.01) |
| *G06Q 20/10* | (2012.01) |
| *H04L 9/00* | (2022.01) |

(52) U.S. Cl.
CPC ................ *G06N 5/04* (2013.01); *G06F 8/65* (2013.01); *G06F 9/4881* (2013.01); *G06N 5/003* (2013.01); *G06N 20/20* (2019.01); *G06Q 20/108* (2013.01); *H04L 9/50* (2022.05)

(58) Field of Classification Search
CPC ........................................................ G06F 8/65
See application file for complete search history.

(56) References Cited

U.S. PATENT DOCUMENTS

| | | | |
|---|---|---|---|
| 8,180,943 B1* | 5/2012 | Priem .................... | G06F 9/4812 710/262 |
| 2015/0074445 A1* | 3/2015 | Huang .................. | G06F 9/3885 713/502 |
| 2015/0319076 A1* | 11/2015 | Vasseur ................. | H04L 45/124 370/238 |
| 2016/0277108 A1* | 9/2016 | Miyamoto ............... | H04N 9/80 |

* cited by examiner

*Primary Examiner* — Jae U Jeon (57) ABSTRACT

The present disclosure relates to system and methods for predicting performance caused by software code changes. For this purpose, an augmented machine learning model predicts a latency of software module with updated code executed in a production environment. In some aspects, the latency is predicted based on a change of deviation that is determined by comparing the latency of the software module with updated code and the latency of the software module without updated code, whereas the software modules are executed in environments different from the production environment.

20 Claims, 5 Drawing Sheets

| FLOW | Latency EnV1 | Latency EnV2 | Latency Stage EnV | Deviation % |
|---|---|---|---|---|
| Flow1 | 600 ms | 1000 ms | 1100 ms | > 10% |
| Flow2 | 500 ms | 900 ms | 940 ms | < 5% |
| Flow3 | 450 ms | 800 ms | 830 ms | < 5% |

FIG. 5

| SNO | Time | Build No | Flow | Production Average (ms) | Enviro-nment | SLA Green/Red TARGET |
|---|---|---|---|---|---|---|
| 1 | 00:30AM | N | Flow 1 | 102 | PROD | Green |
| 2 | 00:30AM | N | Flow 2 | 112 | PROD | Green |
| 3 | 00:30AM | N | Flow 3 | 122 | PROD | Green |
| 4 | 00:30AM | N | Flow 1 | 152 | Master | Green |
| 5 | 00:30AM | N | Flow 2 | 171 | Master | Green |
| 6 | 00:30AM | N | Flow 3 | 189 | Master | Green |
| 7 | 00:30AM | N+1 | Flow 1 | 200 <It should be near by 150> | Stage | RED (Not meeting SLA) |
| 8 | 00:30AM | N+1 | Flow 2 | 172 | Stage | GREEN |
| 9 | 00:30AM | N+1 | Flow 3 | 192 | Stage | GREEN |
| 10 | 01:30AM | N | Flow 1 | 104 | PROD | Green |
| 11 | 01:30AM | N | Flow 2 | 114 | PROD | Green |
| 12 | 01:30AM | N | Flow 3 | 124 | PROD | Green |
| 13 | 01:30AM | N | Flow 1 | 151 | Master | Green |
| 14 | 01:30AM | N | Flow 2 | 173 | Master | Green |
| 15 | 01:30AM | N | Flow 3 | 191 | Master | Green |
| 16 | 01:30AM | N+1 | Flow 1 | 210 | Stage | RED (Not meeting SLA) |
| 17 | 01:30AM | N+1 | Flow 2 | 170 | Stage | GREEN |
| 18 | 01:30AM | N+1 | Flow 3 | 190 | Stage | GREEN |

FIG. 6

| Time | Flow Latency | Flow |
|---|---|---|
| May 9th 2020, 10:59:27.430 | 1,017 | Flow1 |
| May 9th 2020, 10:59:25.880 | 1,388 | Flow2 |
| May 9th 2020, 10:59:23.650 | 1,694 | Flow3 |
| May 9th 2020, 10:59:20.990 | 1,138 | Flow2 |
| May 9th 2020, 10:59:20.820 | 1,327 | Flow4 |
| May 9th 2020, 10:59:20.370 | 880 | Flow5 |
| May 9th 2020, 10:59:18.820 | 1,579 | Flow3 |
| May 9th 2020, 10:59:19.250 | 1,060 | Flow6 |
| May 9th 2020, 10:59:19 | 908 | Flow7 |
| May 9th 2020, 10:59:10 | 998 | Flow3 |
| May 9th 2020, 10:59:10.320 | (6,178) | Flow3 |
| May 9th 2020, 10:59:09.320 | 1,347 | Flow3 |
| May 9th 2020, 10:59:10.920 | 940 | Flow8 |
| May 9th 2020, 10:59:16.710 | 905 | Flow9 |
| May 8th 2020, 23:59:59 | 662 | Flow8 |
| May 8th 2020, 23:59:59:150 | 1,304 | Flow1 |
| May 8th 2020, 23:59:59:220 | 2,147 | Flow9 |
| May 8th 2020, 23:59:59 | 1,189 | Flow2 |
| May 8th 2020, 23:59:59 | 1,266 | Flow3 |
| May 8th 2020, 23:59:59.990 | 1,075 | Flow7 |

SYSTEMS AND METHODS FOR PREDICTING PERFORMANCE

TECHNICAL FIELD

The present specification generally relates to systems and methods for predicting performance caused by changes in software code according to various embodiments of the disclosure.

BACKGROUND

During software development new or updated code needs to be tested in various environments and circumstances to evaluate its functionality as well as its performance. Particularly, performance tests are crucial if updated software code is to be implemented in existing software products in live environments.

In some instances updated software code is tested and evaluated in a special test environment. If the results fulfill certain criteria, i.e. are within a pre-defined threshold, the updated code might be implemented in a live environment. While test environments very often attempt to represent the live environment as much as possible, it still has some limitations. For example, the test environment may differ in hardware or the updated code may interact with other software modules running on the live environment. As a result, test results obtained on the test environment are only limited applicable for a corresponding live environment. Therefore, there is a desire to predict the behavior of a code change or code updates in a live environment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure relates to systems and methods for predicting performance changes caused by software code changes particularly code updates of software being executed on one or more processors. In some embodiments, a system for predicting performance caused by software code changes comprises a non-transitory memory storing instructions and one or more processors coupled to the non-transitory memory and configured to read the instructions from the non-transitory memory to cause the system to perform operations comprising:

obtaining for each of a first environment, a second environment and a stage environment a parameter set indicative of a latency of one or more process flows performed by a plurality of software modules executed on each of the first, second and stage environment, wherein at least one software module on the stage environment comprises updated code compared to the respective module on the first and second environment;

determining a deviation of the latency of the one or more process flows between the stage environment and the second environment; and predicting based on the determined deviation, by an augmented machine learning model, a latency for the one or more process flows performed by the plurality of software modules executed on the first environment.

Another embodiment is related to a computer-implemented method, in which for each of a first environment, a second environment and a stage environment a parameter set indicative of a latency of one or more process flows performed by a plurality of software modules executed on each of the first, second and stage environment is obtained. At least one software module on the stage environment comprises updated code compared to the respective module on the first and second environment. The method comprises determining a deviation of the latency of the one or more process flows between the stage environment and the second environment; and predicting based on the determined deviation, by an augmented machine learning model, a latency for the one or more process flows performed by the plurality of software modules executed on the first environment.

Yet another embodiment is related to a non-transitory machine readable medium having stored thereon machine readable instructions executable to cause a machine to perform operations. The operations comprise:

obtaining for each of a first environment, a second environment and a stage environment a parameter set indicative of a latency of one or more process flows performed by a plurality of software modules executed on each of the first, second and stage environment, wherein at least one software module on the stage environment comprises updated code compared to the respective module on the first and second environment;

determining a deviation of the latency of the one or more process flows between the stage environment and the second environment; and predicting based on the determined deviation, by an augmented machine learning model, a latency for the one or more process flows performed by the plurality of software modules executed on the first environment.

In this regard and for the purpose of this disclosure, the expression "environment" refers generally to a computer processing architecture. A computer processing architecture may comprise a hardware architecture including one or more computers being configured to exchange data via one or more networks. Generally, a computer processing architecture is scalable to the extent that individual computers, processors, non-transitory memory and data storage may be added, exchanged or removed from the hardware architecture depending on the requirement and needs. In some instances, a computer processing architecture may refer to a cloud computer architecture with distributed individual processing units. In some other instances, a computer processing architecture is a single computer. The computer processing architecture also comprises software component usually an operating system and one or more software products including software modules being executed on the computer processing architecture. These software products and software modules may comprise, but are not limited to databases, application software, data exchanges software, streaming software, user interfaces, development platforms and the like. Likewise, software components may be added and executed. Running software may be stopped depending on the needs Communication protocols may be part of a computer processing architecture responsible for handling data exchange and communication between different computers, or software modules within the computer processing architecture, but also between the computer processing architecture and external computers. In some instances, software modules of the computer processing architecture are interacting with each other and output a specific result based on input data thus performing a process flow.

In some instances, the process flow may relate to an online financial transaction or an electronic transfer of funds and/or assets such as, but not limited to, credit or debit card transfer, dynamic currency conversion, bitcoin exchange and the like. In some other instances, the process flow may relate to a transfer of cryptocurrency or more general to processing of block chain or transactions including block chain technology.

In some embodiments, the parameter set comprises an average time for performing each of the one or more process flows performed by the plurality of software modules. It may be possible that an overall time can be separated into separate periods used by each of the software modules acting together to perform for a specific process flow. Thus in some embodiments, the one or more process flow may comprise two or more separable steps associated with a step latency. The step latency for each of the two or more separable steps may be obtained and the average time derived from the results.

In some instances, obtaining a parameter set may comprise receiving from each of the first, the second and the stage environment a time period corresponding to the latency of the one or more process flows. Alternatively, two or more time stamps may be received from each of the first, the second and the stage environment, whereas the two or more time stamps correspond to a start and an end time of the one or more process flows. The parameter set indicative of the latency may be stored in a storage system connected to the non-transitory memory and the one or more processors.

In some instances, the parameter set may further comprise an identifier of the process flow, and optionally an identifier of the environment. The parameter set may also contain status of one or more hardware components associated with the environment. In this regard it may also contain information about the operating system, the actual usage of the available processor time at the time the process flow was performed and the like. Some of the parameters in the parameter set may refer to performance parameters of one or more hardware components associated with the respective environment. For example, performance parameters may include network speed and usage, data storage speed, number of database requests including read and write requests, latency during database requests, processor usage for certain software modules and/or applications and the like. Further parameters of the parameter set may comprise information about the initiator of the process flow, location, IP address as well as any further participants of the one or more process flows.

In some embodiments, the augmented machine learning model for predicting the latency for the one or more process flows may determine based on the parameter set associated with the latency for which a first deviation has been determined, whether the first deviation has exceeded a pre-defined plausibility threshold. In response to the determination that the first deviation has exceeded the pre-defined plausibility threshold, the augmented machine learning model may discard the first deviation and/or the parameter set associated with the latency for which a first deviation has been determined. In some instances, the plausibility threshold is based on a predefined score, optionally a so-called z-score. Other suitable statistical analysis to determine a plausibility or validity of an obtained parameter set may be utilized as well. In some instances, the statistical analysis or the plausibility threshold may be selected depending on the process flow, on the software modules involved or on the software module for which the code has been updated.

In some embodiments, the augmented machine learning model utilizes a decision tree learning as its prediction model. Predicting a latency may also comprise predicting the latency in response to one or more parameter sets of the one or more process flows performed by the plurality of software modules executed on the first environment. In some other embodiments, determining a deviation of the latency or predicting the latency may comprise a classification step, in which the latencies of the one or more process flows are classified based on the parameter set associated with the respective one or more flow. An average latency can be generated from latencies sharing the same or similar class for each of the one or more process flows.

In some embodiments, the system comprises instructions to determine whether a predicted latency exceeds a pre-defined threshold; and in response to the determination that the predicted latency has exceeded the pre-defined plausibility threshold, flag the respective one or more process flows. In addition or alternatively, the updated code may be flagged.

Figure 1:
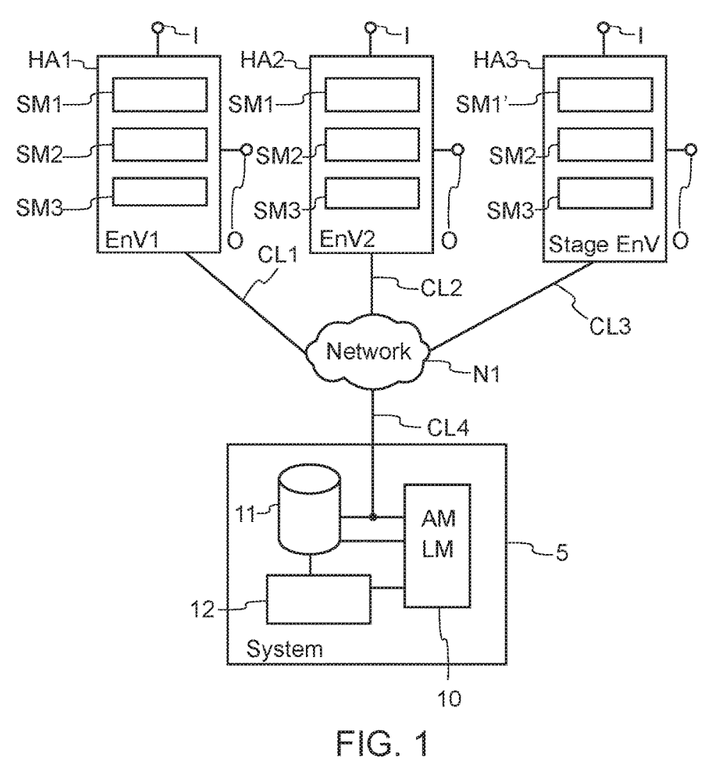
FIG. 1 illustrates a system according to several aspects of the present disclosure.

FIG. 1 shows an embodiment of an arrangement including a system illustrating several aspects of the present disclosure. The arrangement comprises three different environments Env1, Env2 and StageEnv, also referred to for the purpose of this disclosure as production environment, master environment and test stage environment, respectively. The environments are coupled via respective communication links CL1, CL2 and CL3 to a network N1. While in this illustration the communication links are shown as separate elements, the skilled person will understand that the communication links may be part of the network N1. The system S is also coupled to the Network N1 via communication link CL4 and is adapted to receive information from each of the environments. Communication links CL1 to CL4 may include LAN, PTSN, and/or various other wired or wireless networks, like WLAN, 802.11 or Bluetooth. The communication link may share the same protocols and network structure, but can also be implemented using different structures and protocols.

System S generally comprises a non-transitory memory 10, storage 11 and one or more processors 12 coupled together for data exchange. Memory 10 and storage 11 are also connected to communication link CL4 and can received data therefrom. Memory 10 also stores an augmented machine learning model AMLM executed by system S for predicting latency changes cause by software code in accordance with aspects of this disclosure.

As outlined above, each of the environments comprises a computer processing architecture as described above including hardware architecture HA1, HA2 and HA3 and software architecture (not shown). The hardware architecture usually includes one or more processors, non-transitory memory, storage and input and output devices. In various implementations, the hardware architecture may include one or more personal computers, laptops, blade modules, tower-rack, blade server or combinations thereof. In some instances, the hardware architecture can be part of a server farm thus allowing flexibility and scalability. The hardware architecture is adapted for communication including communication with network N1. For the purpose of this disclosure and the examples the various hardware architecture may be similar in processing power, memory or storage or different.

Figure 2:
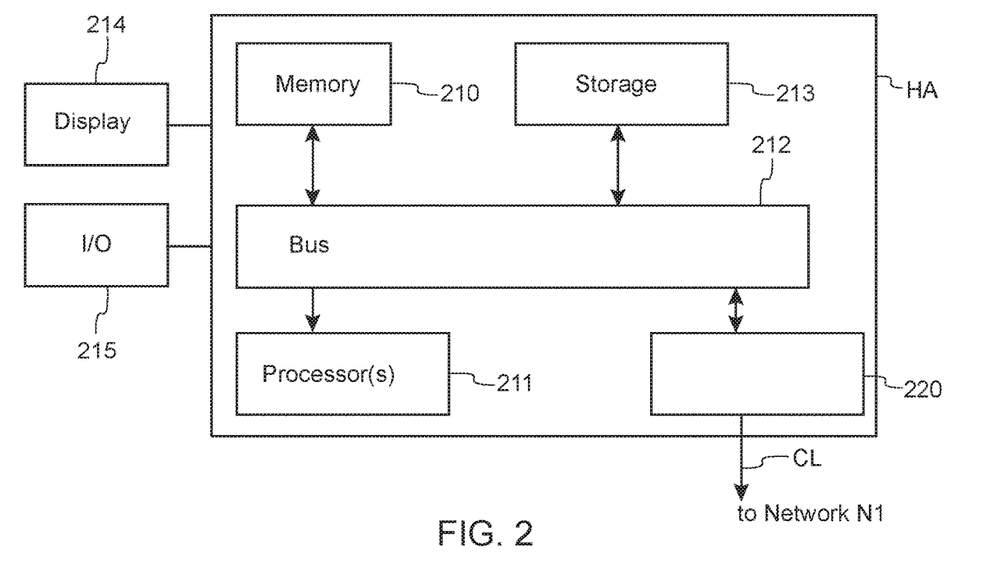
FIG. 2 shows an exemplary hardware architecture according to an embodiment of the present disclosure.

FIG. 2 in this regard illustrates an exemplary block diagram of a more simplified hardware architecture suitable for implementing an environment of the present disclosure. In the example of FIG. 2, the hardware architecture HA includes a bus 212 or other communication mechanism for communicating data, signals, and information between various components of the hardware architecture HA. The components may include an input/output (I/O) component 215 that processes a user (i.e., sender, recipient, service provider) action, such as selecting keys from a keypad/keyboard, selecting one or more buttons or links and sends a corresponding signal to bus 212. The hardware architecture HA may also include an output component, such as a display 214, and a cursor control (not shown) such as a keyboard, keypad, mouse, etc. Display 814 may be configured to present information of all sorts including but not limited to status information about the hardware architecture HA or software components being executed thereupon. Display 214 may also be used to present user input or results of user inputs processed by software on the hardware architecture HA. A network interface 220 transmits and receives signals via the communication link CL between the hardware architecture HA and other devices, such as another hardware architecture HA being part of the environment or the system of the present disclosure. Communication link CL may include LAN, PTSN, and/or various other wired or wireless networks, like WLAN, 802.11 or Bluetooth.

The hardware architecture HA also comprises one or more processors 211, memory 210 and storage 213. The one or more processors 211, memory 210 and storage 213 are coupled to bus 212 and adapted to exchange information and data between each other. The one or more processors may include CPU's, microcontrollers, GPU's, digital signal processor and other processing components. The one or more processor 814 may also control transmission of information through network interface 220. Data storage 213 may include logical and physical storage like databases, one or more hard discs, NAS or other storage devices. In this regard, storage 213 may also include various forms of computer readable media like floppy disks, flexible disks, hard disks, magnetic tape, any other magnetic medium, CD-ROM, any other optical medium.

Referring back to FIG. 1, the respective environments Env1, Env2 and StageEnv comprise a different hardware architecture. For the purpose of this example, hardware architecture HA1 on production environment Env1 is the most potent one in terms of memory, processing power and/or storage. It may include several servers as described above. In comparison thereto, master environment Env2 may comprise a more simplified hardware architecture, while the hardware architecture HA3 of test stage environment StageEnv may comprise only a single computer, for example used for development purposes. Software modules are being executed on each hardware architecture of each environment. In particular, environment Env1 comprises software modules SM1, SM2 and SM3. Likewise, environment ENV2 comprise the same software modules SM1, SM2 and SM3. The software modules SM1, SM2 and SM3 are the equal, that is their version and software code (as well as the executable form in some instances) is equal in both production and master environment. Of course it is to be understood that further software can be executed in the environment and on the respective hardware architecture. To this extent production and master environment may execute partly the same software modules and partly other and different forms of software.

Figure 3:
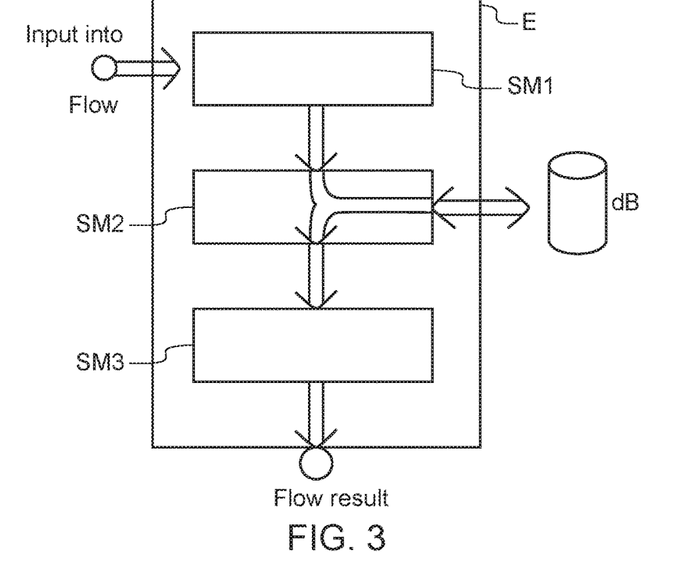
FIG. 3 shows an exemplary process flow performed by software modules in accordance with some aspects of the present disclosure.

The respective software modules SM1, SM2 and SM3 are interacting with each other and together perform a specific process. FIG. 3 illustrates by way of example a possible interaction of the three software modules SM1, SM2 and SM3 to perform a dedicated process. The interaction, input and output of information or data and its processing by the respective software modules are referred to as process flow. In other words, a specific and defined process flow is performed by the respective software modules. In the example, data may be provided as input to the first software module SM1 providing first result as an output stream to second software module SM2. Said software module SM2 is coupled to a database dB or a storage and the like reading and writing data from and to the database in response to the result provided by the first software module. Data is then also provided to the last software module and finally provided as flow result. Each step and consequently each software module may require a certain amount of time to process the data and information. This time may be referred to as module latency, whereas the sum of all module latency is referred to as average or process latency and corresponds to the overall time taken to finalize the process flow. It is understood that each of the latencies may be affected by various parameters including the hardware architecture and processing power on which the software modules are executed.

Referring back to FIG. 1 and in accordance with the present disclosure, test stage environment HA3 comprises also three software modules SM1', SM2 and SM3. While software modules SM2 and SM3 are the same compared to the master and production environment, software module SM1 is amended and contains updated code provided for example by a software developer. The updated code affects the respective latency time for the respective module SM1' but the effect is not restricted to the latency of module SM1 alone. Rather, the execution of software modules SM1' with the updated code can also affect further software modules and as such their modules latencies may change as well. Consequently, the process latency utilizing the amended software module SM1' is affected by the change in the code.

In accordance with the present disclosure, system S obtains for each of the environments Env1, Env2 and the test stage environment StageEnv a parameter set indicative of the process latency of one or more process flows performed by a plurality of software modules executed on each of the environments Env1, Env2 and the test stage environment StageEnv. At least one software module on the test stage environment StageEnv comprises updated code compared to the respective module on the first and second environment.

Figure 5:
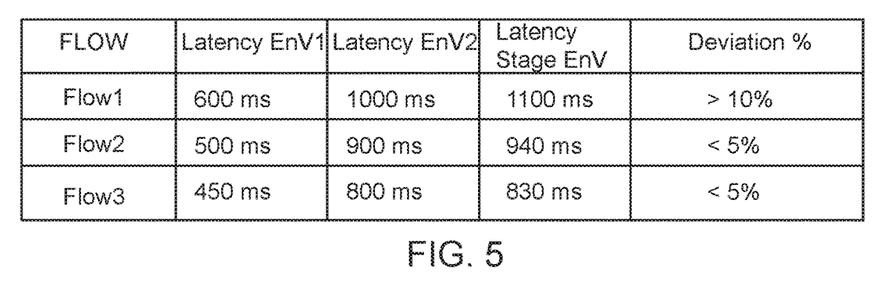
FIG. 5 is an exemplary table illustrating a latency according some aspects of the present disclosure.

FIG. 5 illustrates an example of a table showing the process latencies for three different flows "Flow1", "Flow2" and "Flow3" performed by the software modules for each environment Env1, Env2 and StageEnv. In the example, the latency for the production environment Env1 is the lowest for each of the process flows. The latency in master environment Env2 is 400 ms larger for process flows "Flow1" and "Flow2", but only 350 ms larger for the last process flow "Flow3". Such difference could be explained for example by the nature of the respective process flow, which can when performed on the master environment a bit faster than the other process flows. The updated code in one of the software modules is executed on the test stage environment causing some additional latency with regards to the latency in the master environment Env2. The obtained process latency may be stored together with further parameters in a storage attached or integrated within system S. Further parameters may include the date and time when the process flow was performed, a process flow identifier, information about hardware or software components of the respective environment, information about the current performance of the respective environment like processing usage, memory usage, number of database or storage requests and the like. Generally, parameters related to the respective environment may be stored, which can have an effect on the execution of one or more software module and thereby also affect the module latency and thus the overall process flow latency. In some instances, information about the initiator of the respective process flow may be obtained and stored by system S.

In some instances, system S may classify the latencies of the one or more process flows based on the parameter set associated with the respective one or more flows. Classification examples may include a certain time of day, in which the process flows are performed, a certain location, certain hardware component on which they are executed and the like. Classification can be based on all information in the parameters set. Classification can reduce the number of data sets for later prediction and can generate more stable results without compromising the plausibility of the output results. System S may then generate an average latency from individual process latencies of the same of similar classes for each of the environments. In instances where the overall number of performed process flows is small (i.e. in the test stage environment) the classification step may be omitted.

In accordance with the present disclosure, a deviation is determined by system S in case the latency of the test environment for a corresponding flow is greater than the latency of the same process flow in the master environment. This so called positive deviation can be determined for example using the following formula:

$$\text{DEVIATION[process flow]} = (\text{average time taken on test stage environment} - \text{average time taken on master environment})/100$$

wherein "DEVIATION" is the deviation between the master environment and the test stage environment for the respective process flow expressed in percentage. If the updated code is executed with smaller latency on the test stage environment than on the master environment, a negative deviation is assumed and system S may refrain from calculating a deviation. In such case it is assumed that performance of the updated code will not negatively affect the production environment.

Any determined deviation may then be compared with one or more thresholds by system S. If the determined deviation exceed a pre-defined maximum threshold, system S may in some instances directly flag the updated code or the respective process flow and software module to indicate the deviation is too large and a prediction step will most likely come to the same conclusion. Such intermediate step can reduce the number of predictions to be performed by the augmented machine learning model. Alternatively or additionally, the augmented machine learning model performs in some instances statistical analysis on the obtained and optionally averaged latencies or deviations. Augmented machine learning model AMLM of system S determines based on the parameter set associated with the latency for which a positive deviation has been determined, whether the positive deviation has exceeded a pre-defined plausibility threshold. In response to the determination that the first deviation has exceeded the pre-defined plausibility threshold, augmented machine learning model AMLM may flag or otherwise mark the respective parameter set. In some instances, the augmented machine learning model may discard the deviation and/or the parameter set associated with the latency for which said deviation has been determined. In some instances, the plausibility score may reflect a defined distribution, including for example a Gaussian distribution. Consequently, the plausibility threshold can be based on a pre-defined score derivable from the distribution, for example the z-score.

Figure 7:
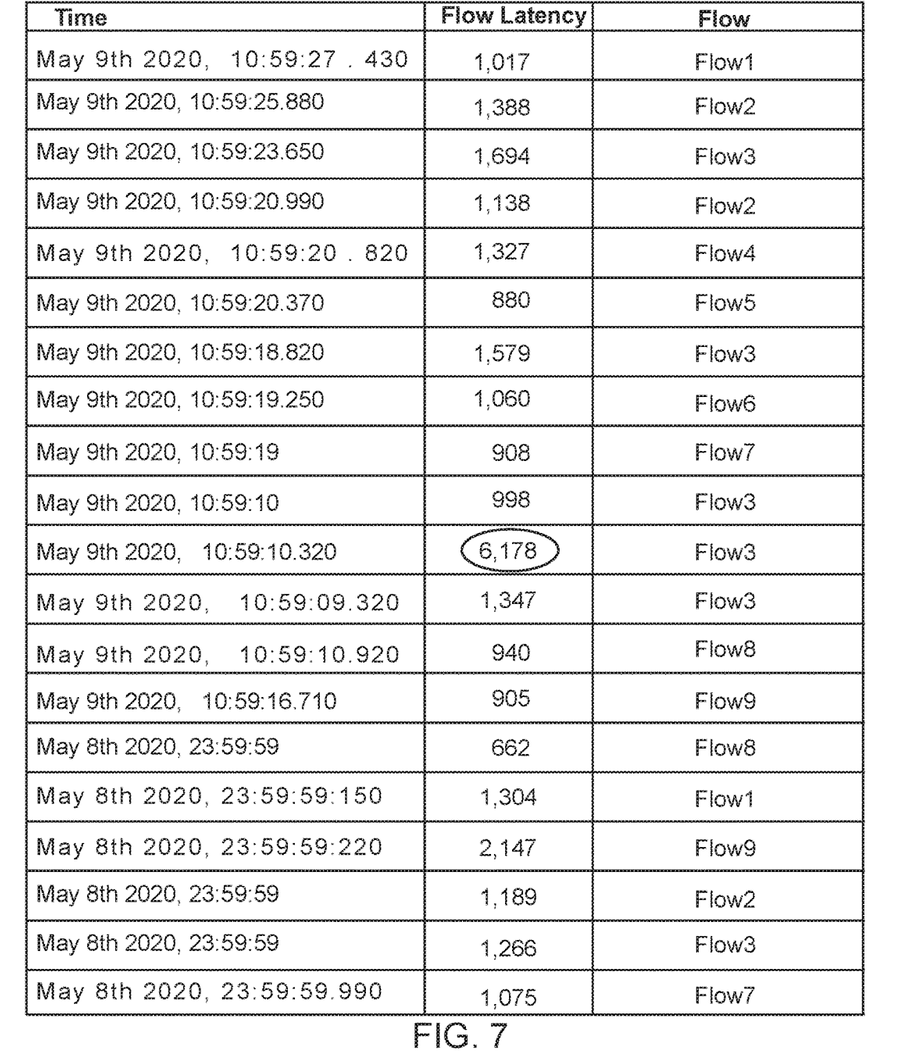
FIG. 7 shows another table to illustrate some aspects of the present disclosure.

FIG. 7 shows an example, in which a flow "Flow3" has been marked as so called outliers, that is the flow exceeds the plausibility threshold, because the flow latency at this specific time is significantly larger than the flow latencies for the same flow "Flow3" at slightly different times. The statistical analysis performed by system S on the respective flow indicates that the latency is caused by an artificial influence not related to the usual performance of the environment. For example, the large latency could be caused by a network traffic collision, hard disk failure, delayed execution of request at databases and the like.

In accordance with the present disclosure, the augmented machine learning model will predict based on the determined deviation, a latency for the one or more process flows performed by the plurality of software modules executed on the productive environment. The augmented machine learning model has been previously trained and is adapted to find correlations between the parameter sets associated with the respective flows and latencies for the environments. Consequently, the augmented machine learning model utilizes not only the latencies themselves but all information included in the one or more parameter sets of the one or more process flows performed by the plurality of software modules executed on the productive environment. Different models for machine learning can be used including, but not limited thereto a decision tree learning model.

Figure 6:
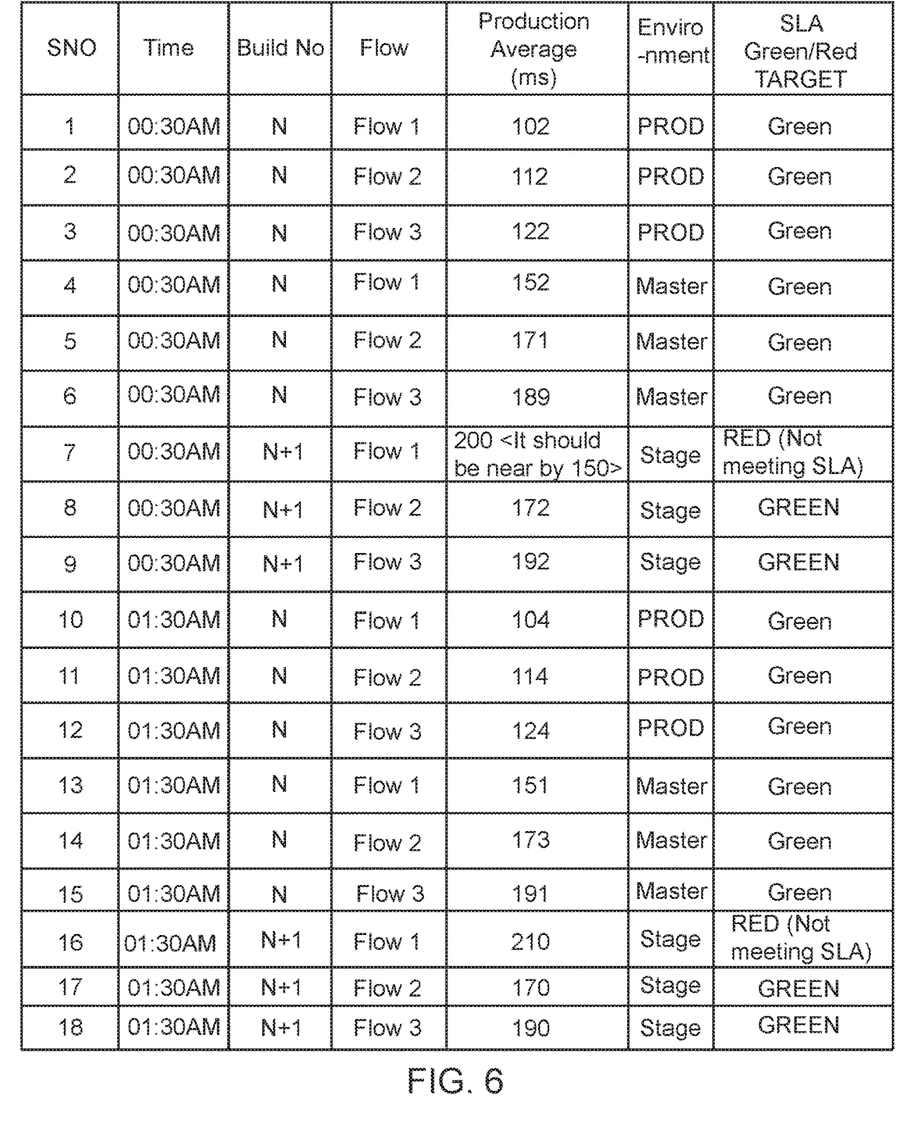
FIG. 6 is an exemplary table according some aspects of the present disclosure.

FIG. 6 illustrates an exemplary table showing the results of such prediction for the production environment PROD in comparison to actual measurements and determination in the master environment. The table includes information on the parameter set, in particular the time and the build No. that is the version of the respective code of the software modules being executed on the respective environments. Three different process flows referred to as "Flow1", "Flow2" and "Flow3" are illustrated. The table also presents some final marker in the last column to provide guidance to a user to evaluate if and to what extent the updated code affects the performance of the respective flows.

For example, sample numbers SNO 1 to 3 show the latencies "production average (ms)" for the three flows in the production environment at time 00:30 AM. Similar data is obtained for 01:30 AM. As apparent from the table, the respective flows are performed a little slower (2 ms) when being performed at 01:30 AM. The cause for such increased latency may be explained by for example an increased traffic or load on the production environment, but also by a more complex process flow requiring simply more execution time or more read and write requests to storages. Sample number rows 4, 5, 6 and 13, 14 and 15 contain the average latencies for the same process flows performed by the same software modules and at the same time, respectively, but for the master environment Master. As apparent there is an expected increase in latency, when a process flow is performed on the master environment compared to the corresponding flow on the production environment. For example, process flow "Flow1" at 00:30 AM has an additional latency on the master environment compared to the same flow in the production environment. However, comparing process flows Flow2 and Flow3 between master environment and production environment at 00:30 AM, one recognizes that the latency increase varies. The variation may be an indication that the master environment is affecting the execution of the process flows Flow2 and Flow3. Comparing now the average latencies at 01:30 AM for the master environment with those at 00:30 AM, one recognizes that its variations and behaviour differs from the corresponding variation in the production environment at both times.

In accordance with the present disclosure, the augmented machine learning model determines for each respective flow, based on the deviation between the master environment Master and stage test environment Stage as described above, a latency change for the respective process flow with the updated code on the stage environment. The results are presented in rows 7 to 9 and 16 to 18 corresponding to Build No. N+1. As shown in row 7, it is predicted that the updated code will significantly increase the latency, assumable up to an average latency of 200 ms. The augmented reality learning model also flags such result as it seem implausible due to the fact that for process flows Flow2 and Flow3 such latency increase is not predicted. Likewise such extraordinary increase is predicted for process flow Flow1 in row 16.

In accordance with the present disclosure, the augmented reality model also flags each row to indicate whether the obtained and predicted latencies actually meet the threshold requirement, see the last column in table of FIG. 6. Accordingly, lines 7 and 16 are marked as red, e.g. for not meeting a defined service level agreement SLA indicating a developer or another user to further investigate. Together with a prediction of plausibility for the respective predicted flow (e.g. as indicated in line 7), a decision may be taken whether to implement the updated code into the production environment, investigate a possible deviation or re-develop the code to avoid or reduce excessive additional latency.

Figure 4:
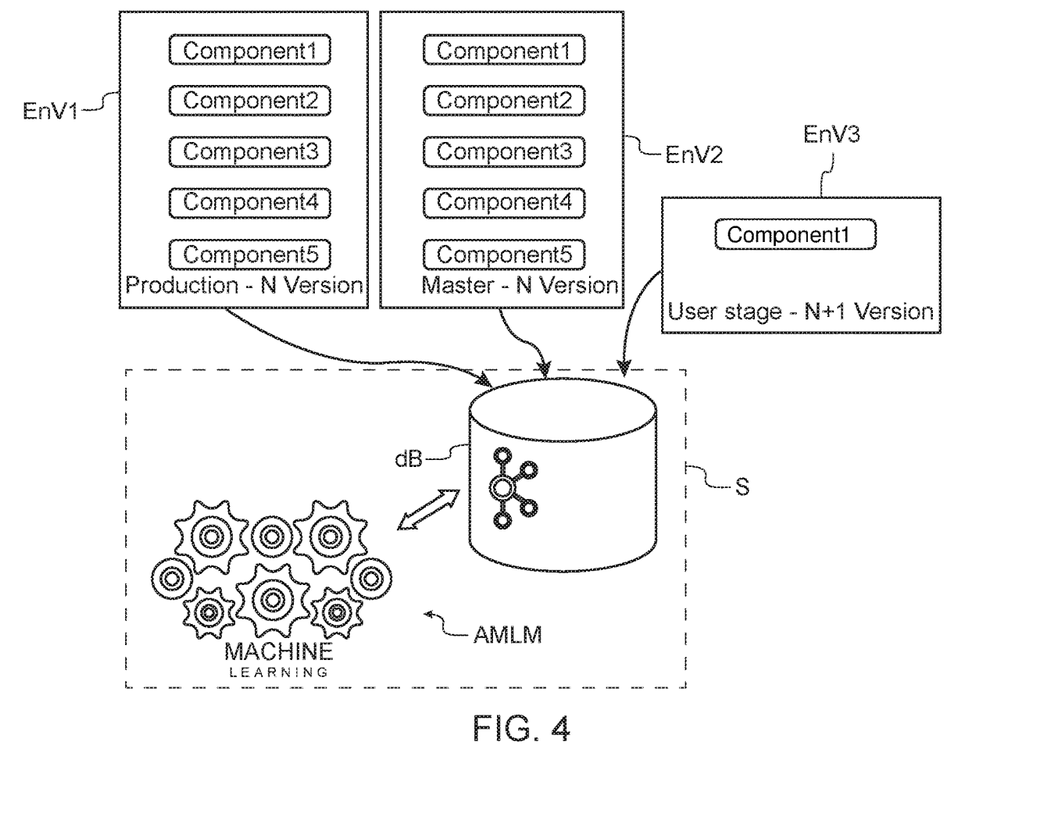
FIG. 4 illustrates an exemplary system according to several aspects of the present disclosure.

FIG. 4 shows an embodiment illustrating several aspects of the present disclosure using some tools available for data processing and development. As in the previous example, three environments are provided, namely a production environment Env1, a master environment Env2 and a test stage or user stage environment Env3. Production and master environment include one or more software modules named "Component1", "Component2", "Component3", "Component4" and "Component5", respectively. These software modules are interacting with each other to provide one or more process flows related to financial transactions including but not limited to credit card payment, bank transfer, express checkout, withdrawals and the like. When such process flow is being performed, the respective environment measures the latency time that is the time from start of the process to its finish and provides the measured latency together with several other parameters to system S. The various parameter obtained by system S from the various environments are described herein but are not limited to. Generally, any parameter which can affect the performance and latency of a process flow may be transmitted to system S for evaluation and prediction. Test stage environment Env3 also contain the software modules whereas one or more software modules may comprise updated code. In the presented example software module "Component1" has been updated, other software modules are left unchanged and are not illustrated for simplicity.

System S comprises a data storage dB, which in this exemplary case is implemented by utilizing the Apache Kafka® platform. Apache Kafka® is a distributed streaming platform that is suitable for real-time database transactions. The platform may be executed on a single computer but can also be executed on a cluster on one or more servers that in some instances may even span multiple datacenters. The platform comprises input and output channels referred to as producers and consumers, respectively. In some instances, the producers include the environments Env1, Env2 and Env3 that transmit parameter sets including the latency to the platform for storage and processing. The augmented machine learning model act as a stream processor, consuming an input stream from one or more topics and producing an output stream to one or more output topics in the Kafka platform.

Augmented machine learning model AMLM consumes parameter sets indicative of the latency in the various environments and determines the positive deviation between the master and the sage environment. It produces the determined deviation back to Kafka and its storage. AMLM then utilizes a decision tree model to predict the deviation of the updated software code in the production environment from the determined deviations and the information in the parameter sets.

Figure 8:
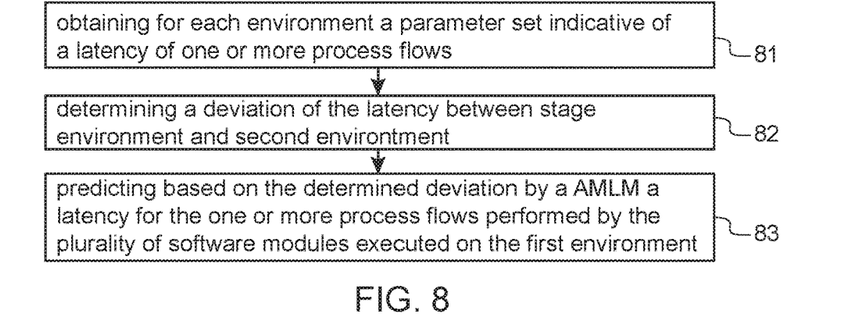
FIG. 8 shows an exemplary embodiment of a method according to some aspects of the present disclosure.

FIG. 8 shows a computer-implemented method comprising a first step 81 of obtaining for each of a first environment, a second environment and a stage environment a parameter set indicative of a latency of one or more process flows performed by a plurality of software modules executed on each of the first, second and stage environment. In accordance with some embodiments at least one software module on the stage environment comprises updated code compared to the respective module on the first and second environment. In a next step 82, a deviation of the latency of the one or more process flows between the stage environment and the second environment is determined. An augmented machine learning model will then predict in step 83 based on the determined deviation a latency for the one or more process flows performed by the plurality of software modules executed on the first environment.

Figure 9:
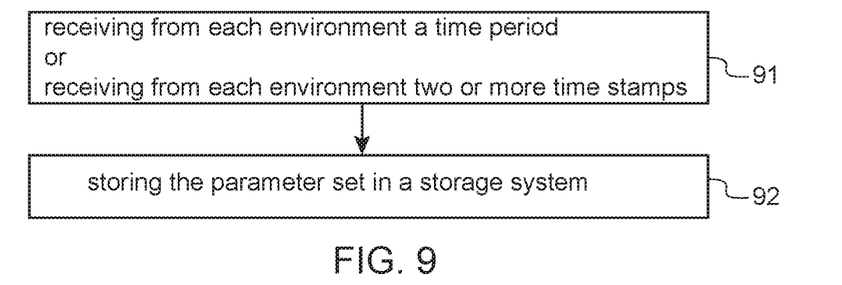
FIG. 9 illustrates some aspects of a method according to a method according of the present disclosure.

In accordance with some aspects illustrated in FIG. 9, obtaining a parameter set comprises in step 91 receiving from each of the first, the second and the stage environment a time period corresponding to the latency of the one or more process flows. Alternatively, two or more time stamps can be received from each of the first, the second and the stage environment two or more time stamps corresponding to start and the end time of the one or more process flows. Further as an alternative, a time stamp indicative of the start or end tie in addition to an execution time period can be received. The parameter set indicative of the latency is stored in step 92.

Figure 10:
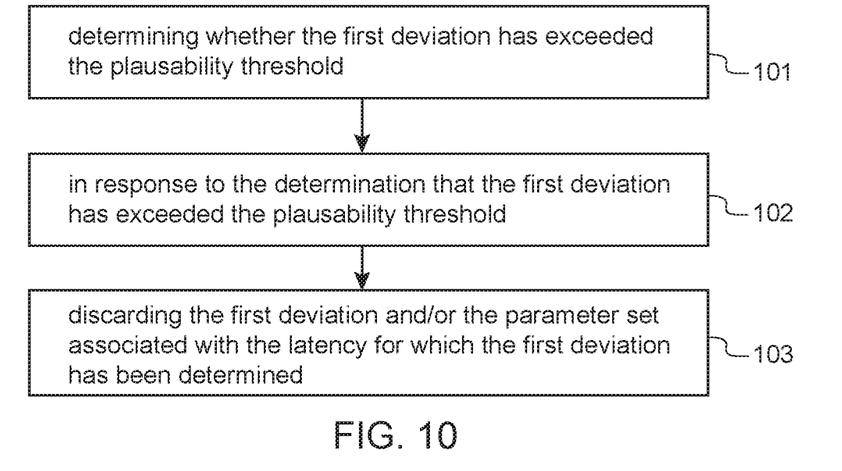
FIG. 10 illustrates some aspects of a method according to a method according of the present disclosure.

In some embodiments a plausibility analysis is conducted as outlined in the method of FIG. 10. System S and an augmented machine learning model may determine in step 101 based on the parameter set associated with the latency for which a first deviation has been determined, by the augmented machine learning model, whether the first deviation has exceeded a pre-defined plausibility threshold. In response to the determination that the first deviation has exceeded the pre-defined plausibility threshold, the first deviation and/or the parameter set associated with the latency for which a first deviation has been determined will be discarded in step 103.

Figure 11:
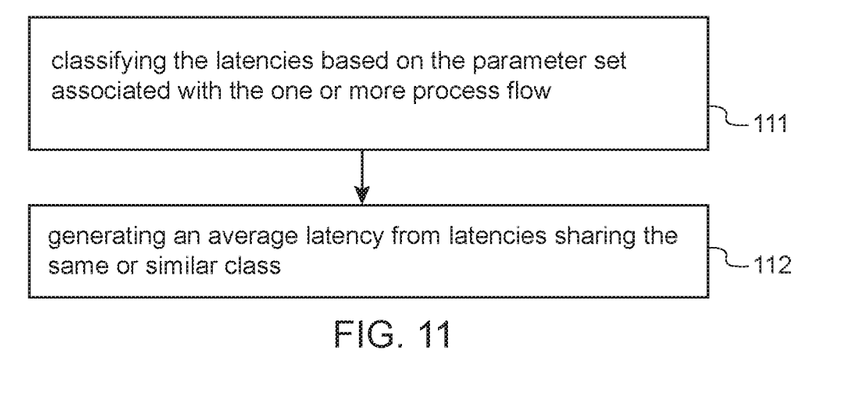
FIG. 11 illustrates some aspects of a method according to a method according of the present disclosure.

FIG. 11 shows some aspects concerning a classification procedure performed by the system S or a component thereof. In step 111, latencies of the one or more process flows based on the parameter set associated with the respective one or more flow are classified. For each of the one or more process flows, an average latency from latencies sharing the same or similar class may be generated in step 112, thus reducing the amount of datasets.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. Where applicable, the ordering of various steps described herein may be changed, combined into composite steps, and/or separated into sub-steps to provide features described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of the application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for predicting performance caused by software code changes comprising:
   a non-transitory memory storing instructions; and
   one or more processors coupled to the non-transitory memory and configured to read the instructions from the non-transitory memory to cause the system to perform operations comprising:
   obtaining for each of a first environment, a second environment and a stage environment a parameter set indicative of a latency of one or more process flows performed by a plurality of software modules executed on each of the first, second and stage environments, wherein at least one software module on the stage environment comprises updated code compared to the respective module on the first and second environment;
   determining a deviation of the latency of the one or more process flows between the stage environment and the second environment; and
   predicting based on the determined deviation, by an augmented machine learning model, a latency for the one or more process flows performed by the plurality of software modules executed on the first environment.

2. The system of claim 1, wherein the parameter set comprises an average time for performing each of the one or more process flows performed by the plurality of software modules.

3. The system of claim 1, wherein obtaining a parameter set comprises at least one of:
   receiving from each of the first, the second and the stage environments a time period corresponding to the latency of the one or more process flows;
   receiving from each of the first, the second and the stage environments two or more time stamps corresponding to start and end times of the one or more process flows; and
   storing the parameter set indicative of the latency in a storage system connected to the non-transitory memory and the one or more processors.

4. The system of claim 1, wherein the parameter set further comprises at least one of:
   an identifier of the process flow;
   an identifier of the environment;
   status of one or more hardware components associated with the environment;
   performance parameters of one or more hardware components associated with the environment;
   location or address of an initiator; or
   location of any participant of the one or more process flows.

5. The system of claim 1, wherein the one or more process flows comprise two or more separable steps, each separable step associated with a step latency, and wherein obtaining the parameter set indicative of a latency comprises:
   obtaining the step latency for each of the two or more separable steps.

6. The system of claim 1, wherein predicting by an augmented machine learning model comprises:
   determining based on the parameter set associated with the latency for which a first deviation has been determined, by the augmented machine learning model, whether the first deviation has exceeded a pre-defined plausibility threshold; and
   in response to the determination that the first deviation has exceeded the pre-defined plausibility threshold,
   discarding the first deviation and/or the parameter set associated with the latency for which a first deviation has been determined.

7. The system of claim 6, wherein the plausibility threshold is based on a predefined score.

8. The system of claim 1, wherein the augmented machine learning model utilizes a decision tree learning as its prediction model.

9. The system of claim 1, wherein predicting a latency comprises:

predicting the latency in response to one or more parameter sets of the one or more process flows performed by the plurality of software modules executed on the first environment.

10. The system of claim 9, further comprising:
determining whether a predicted latency exceeds a pre-defined threshold; and
in response to the determination that the predicted latency has exceeded the pre-defined threshold at least one of:
flagging the respective one or more process flows; and
flagging the updated code.

11. The system of claim 1, wherein determining a deviation of the latency or predicting the latency comprises:
classifying the latencies of the one or more process flows based on the parameter set associated with the respective process flow; and
generating, for each of the one or more process flows, an average latency from latencies sharing the same or similar class.

12. The system of claim 1, wherein the one or more process flows relate to at least one of:
an online financial transaction;
an electronic transfer of assets; and
a transfer of cryptocurrency.

13. A computer-implemented method comprising:
obtaining for each of a first environment, a second environment and a stage environment a parameter set indicative of a latency of one or more process flows performed by a plurality of software modules executed on each of the first, second and stage environment, wherein at least one software module on the stage environment comprises updated code compared to the respective module on the first and second environment;
determining a deviation of the latency of the one or more process flows between the stage environment and the second environment; and
predicting based on the determined deviation, by an augmented machine learning model, a latency for the one or more process flows performed by the plurality of software modules executed on the first environment.

14. The computer-implemented method of claim 13, wherein obtaining a parameter set comprises at least one of:
receiving from each of the first, the second and the stage environment a time period corresponding to the latency of the one or more process flows;
receiving from each of the first, the second and the stage environments two or more time stamps corresponding to start and end times of the one or more process flows; and
storing the parameter set indicative of the latency in a storage system.

15. The computer-implemented method of claim 13, wherein the parameter set further comprises at least one of:
an identifier of the process flow;
an identifier of the environment;
status of one or more hardware components associated with the environment;
performance parameters of one or more hardware components associated with the environment;
location or address of an initiator; or
location of any participant of the one or more process flows.

16. The computer-implemented method of claim 13, wherein predicting by an augmented machine learning model comprises:
determining based on the parameter set associated with the latency for which a first deviation has been determined, by the augmented machine learning model whether the first deviation has exceeded a pre-defined plausibility threshold; and
in response to the determination that the first deviation has exceeded the pre-defined plausibility threshold,
discarding the first deviation and/or the parameter set associated with the latency for which the first deviation has been determined.

17. The computer-implemented method of claim 13, wherein the augmented machine learning model utilizes a decision tree learning model as its prediction model.

18. The computer-implemented method of claim 13, wherein predicting a latency comprises:
predicting the latency in response to one or more parameter sets of the one or more process flows performed by the plurality of software modules executed on the first environment.

19. The computer-implemented method of claim 13, wherein determining a deviation of the latency or predicting the latency comprises:
classifying the latencies of the one or more process flows based on the parameter set associated with the respective process flow; and
generating, for each of the one or more process flows, an average latency from latencies sharing the same or similar class.

20. A non-transitory machine readable medium having stored thereon machine readable instructions executable to cause a machine to perform operations comprising:
obtaining for each of a first environment, a second environment and a stage environment a parameter set indicative of a latency of one or more process flows performed by a plurality of software modules executed on each of the first, second and stage environments, wherein at least one software module on the stage environment comprises updated code compared to the respective module on the first and second environments;
determining a deviation of the latency of the one or more process flows between the stage environment and the second environment; and
predicting based on the determined deviation, by an augmented machine learning model, a latency for the one or more process flows performed by the plurality of software modules executed on the first environment.

* * * * *